US010736016B2

(12) United States Patent
Scott

(10) Patent No.: US 10,736,016 B2
(45) Date of Patent: Aug. 4, 2020

(54) MOBILE ROUTING FOR NON-GEOSTATIONARY ORBIT (NGSO) SYSTEMS USING VIRTUAL ROUTING AREAS (VRAS)

(71) Applicant: The Boeing Company, Chicago, IL (US)

(72) Inventor: James P. Scott, Manhattan Beach, CA (US)

(73) Assignee: The Boeing Company, Chicago, IL (US)

(*) Notice: Subject to any disclaimer, the term of this patent is extended or adjusted under 35 U.S.C. 154(b) by 98 days.

(21) Appl. No.: 15/942,311

(22) Filed: Mar. 30, 2018

(65) Prior Publication Data

US 2019/0306778 A1   Oct. 3, 2019

(51) Int. Cl.
*H04L 29/02* (2006.01)
*H04W 40/24* (2009.01)
(Continued)

(52) U.S. Cl.
CPC .......... *H04W 40/24* (2013.01); *H04B 7/1851* (2013.01); *H04B 7/18508* (2013.01);
(Continued)

(58) Field of Classification Search
CPC ....... H04L 45/586; H04L 29/02; H04L 45/70; H04L 45/021; H04L 29/08972; H04W 84/06; H04N 21/2665
See application file for complete search history.

(56) References Cited

U.S. PATENT DOCUMENTS

2014/0146705 A1* 5/2014 Luxenberg ............ H04L 45/586
370/254
2018/0092020 A1   3/2018 Torres et al.
(Continued)

FOREIGN PATENT DOCUMENTS

EP         0961420 A1 * 12/1999 ............. H04B 7/195

OTHER PUBLICATIONS

Song et al., "Snapshot Integration Routing for High-Resolution Satellite Sensor Networks based on Delay-Tolerant Network", 2015 (Year: 2015).*
(Continued)

*Primary Examiner* — Salvador E Rivas
(74) *Attorney, Agent, or Firm* — Haynes and Boone LLP

(57) ABSTRACT

Systems, methods, and apparatus for mobile routing for non-geostationary orbit (NGSO) systems using virtual routing areas (VRAs) are disclosed. A disclosed method comprises generating a plurality of routing graphs for each of a plurality of VRAs. Each of the routing graphs is for a different period of time, and comprises a gateway and satellites that are within view of each other and of the gateway during the period of time associated with the routing graph. The method further comprises generating at least one time-sliced graph for each of the routing graphs, where each of the time-sliced graphs shows connectivity between at least some of the satellites, which are on the routing graph associated with the time-sliced graph, with each other. Further, the method comprises, during each of the periods of the time, establishing communications between the satellites according to each of the time-sliced graphs for the period of time.

20 Claims, 5 Drawing Sheets

(51) Int. Cl.
  *H04W 36/08*      (2009.01)
  *H04B 7/185*      (2006.01)
  *H04N 21/2665*    (2011.01)
  *H04L 12/721*     (2013.01)
  *H04W 84/06*      (2009.01)
  *H04L 12/755*     (2013.01)
  *H04L 29/08*      (2006.01)

(52) U.S. Cl.
  CPC ......... *H04B 7/18521* (2013.01); *H04L 29/02* (2013.01); *H04L 45/70* (2013.01); *H04N 21/2665* (2013.01); *H04W 36/08* (2013.01); *H04L 29/08972* (2013.01); *H04L 45/021* (2013.01); *H04W 84/06* (2013.01)

(56) References Cited

U.S. PATENT DOCUMENTS

2018/0098247 A1*  4/2018  Gopal ..................... H04L 45/28
2019/0181946 A1*  6/2019  Wendling ............... H04B 7/195

OTHER PUBLICATIONS

Fotopoulou-Prigiba et al., "GCRP: Geographic Virtual Circuit Routing Protocol for Ad Hoc Networks", 2004, pp. 416-425 (Year: 2004).*

Song et al., "Snapshot Integration Routing for High-Resolution Satellite Sensor Networks based on Delay-Tolerent Network," IEEE International Conference on Computer and Information Technology, 2015, pp. 2400-2406, IEEE, Piscataway, NJ, USA.

Werner, Markus, "A Dynamic Routing Concept for ATM-Based Satellite Personal Communication Networks", IEEE Journal on selected areas in Communications, IEEE Service Center, Piscataway, U.S., vol. 15, No. 8, Oct. 1, 1997.

Yan et al., "Message Prioritization Support for Space Delay/ Disruption Tolerant Networks", 2016 IEEE International Conference on Wireless for Space and Extreme Environments (WISEE), IEEE, pp. 87-92, Sep. 26, 2016.

He et al., "Delay-bounded and Minimal Transmission Broadcast in LEO Satellite Networks", 2016 IEEE International conference on Communications (ICC), IEEE, pp. 1-7, May 22, 2016.

* cited by examiner

400

MOBILE ROUTING FOR NON-GEOSTATIONARY ORBIT (NGSO) SYSTEMS USING VIRTUAL ROUTING AREAS (VRAS)

FIELD

The present disclosure relates to routing of traffic in mobile satellite systems. In particular, it relates to routing packet traffic for non-geostationary orbit (NGSO) mobile systems using virtual routing areas (VRAs).

BACKGROUND

Non-geostationary orbit (NGSO) systems employ constellations of satellites in low earth orbit (LEO) or medium earth orbit (MEO) that sweep across the earth at high rates of speed relative to geostationary earth orbit (GEO) satellites. As such, NGSO systems require a much larger number of terminal (e.g., ground antenna) handovers to be supported than GEO systems. In addition, unlike GEO systems, where terminal handovers are caused solely by terminal mobility (e.g., beam handover), NGSO systems necessarily must support multiple types of handovers including, but not limited to, inter-satellite handovers (due to satellite motion, rotation of the earth, and/or path optimization), inter-gateway handovers (due to rotation of the earth, user terminal mobility, and/or path optimization), link handovers (due to link outages, which may be due to node and/or link failures), and beam handovers (due to satellite motion, rotation of the earth, beam squint, and/or user terminal mobility).

Current solutions for routing NGSO systems employ link-state routing using on-board narrowband internet protocol (IP) routers (i.e. routers on-board the satellites). This approach implies that on-board routers establish and maintain links with their neighboring routers, establish and maintain synchronization of a link-state database at run time, and modulate/demodulate and inspect data packets at run-time in order to make real-time routing and forwarding decisions. As such, the routing for the entire satellite network needs to be updated in real-time each time there is a handover event. Because the entire network has to be updated for each handover event and because the NGSO system connectivity is constantly changing, the network management system must perform a large number of calculations for each update of the routing. Due to scalability issues with link-state routing, this approach does not scale beyond a few hundred satellites and associated links. Further, this approach does not provide a performant or scalable solution for addressing user terminal handover requirements.

There is therefore a need for an improved routing technique that allows for scalability for large NGSO satellite constellations as well as compliance with user terminal handover requirements.

SUMMARY

The present disclosure relates to a method, system, and apparatus for mobile routing for non-geostationary orbit (NGSO) systems using virtual routing areas (VRAs). In one or more embodiments, a method for routing a satellite system comprises generating, by at least one processor, a plurality of connected graphs, referred to as routing graphs, for each of a plurality of virtual routing areas (VRAs). Vertices (or nodes) on the routing graphs indicate satellites, ground gateways, terminals (e.g., user terminals, aero terminals, and/or maritime terminals), and/or terrestrial cellular antennas/base stations. And, edges (i.e. lines, or links, between the nodes to connect the nodes) on the routing graphs indicate links used to interconnect satellites with satellites within or across orbital planes or constellations, satellites with terminals, satellites with terrestrial cellular antennas/base stations, satellites with a ground gateway of a VRA, or any other combination thereof. In one or more embodiments, each of the routing graphs, for each of the VRAs, is for a different period of time. In at least one embodiment, each of the routing graphs, for each of the VRAs, comprises a gateway, which is associated with the VRA associated with the routing graph, and satellites that are within view of each other and of the gateway during the period of time associated with the routing graph. The method further comprises generating, by at least one processor, at least one time-sliced graph for each of the routing graphs. In one or more embodiments, each of the time-sliced graphs shows connectivity between at least some of the satellites, which are on the routing graph associated with the time-sliced graph, with each other. Further, the method comprises, during each of the periods of the time, establishing, by at least one processor, connectivity between the satellites according to each of the time-sliced graphs for each of the VRAs for the period of time.

In one or more embodiments, the method further comprises, during each of the periods of the time, allocating, by at least one processor, internet protocol (IP) addresses, which are associated with the gateway of each of the VRAs, to the satellites on the routing graph for each of the VRAs for the period of time. In some embodiments, an internet protocol (IP) is utilized for all of the communications within the satellite system.

In at least one embodiment, each of the routing graphs shows connectivity between at least one terminal and at least some of the satellites, which are on the routing graph. In some embodiments, the method further comprises, during each of the periods of the time, establishing, by at least one processor, connectivity between at least one terminal and the satellites according to each of the routing graphs for each of the VRAs for the period of time.

In one or more embodiments, at least one terminal is stationary or mobile. In some embodiments, at least one terminal comprises a baseband modem and at least one terrestrial antenna, an airborne antenna, or a marine antenna.

In at least one embodiment, each of the routing graphs shows connectivity between at least one terrestrial cellular antenna/base station and at least some of the satellites, which are on the routing graph. In some embodiments, the method further comprises, during each of the periods of the time, establishing, by at least one processor, connectivity between at least one terrestrial cellular antenna/base station and the satellites according to each of the routing graphs for each of the VRAs for the period of time.

In at least one embodiment, at least one processor is located at a global network operation center (GNOC). In some embodiments, each of the gateways comprises a ground antenna associated with a satellite ground station.

In one or more embodiments, each of the satellites is a low earth orbiting (LEO) satellite, a medium earth orbiting (MEO) satellite, or a geostationary earth orbit (GEO) satellite. In some embodiments, each of the satellites is in a polar orbit or an inclined orbit.

In at least one embodiment, a satellite system comprises a plurality of satellites and a plurality of gateways. The system further comprises at least one processor to generate a plurality of routing graphs for each of a plurality of virtual routing areas (VRAs). In one or more embodiments, each of the routing graphs, for each of the VRAs, is for a different period of time. In at least one embodiment, each of the routing graphs, for each of the VRAs, comprises one of the gateways, which is associated with the VRA associated with the routing graph, and the satellites that are within view of each other and of the gateway during the period of time associated with the routing graph. In some embodiments, at least one processor is further to generate at least one time-sliced graph for each of the routing graphs. In one or more embodiments, each of the time-sliced graphs shows connectivity between at least some of the satellites, which are on the routing graph associated with the time-sliced graph, with each other. In at least one embodiment, at least one processor is further to establish, during each of the periods of the time, connectivity between the satellites according to each of the time-sliced graphs for each of the VRAs for the period of time.

In one or more embodiments, during each of the periods of the time, at least one processor is further to allocate internet protocol (IP) addresses, which are associated with the gateway of each of the VRAs, to the satellites on the routing graph for each of the VRAs for the period of time.

In one or more embodiments, each of the routing graphs shows connectivity between at least one terminal and at least some of the satellites, which are on the routing graph. In some embodiments, during each of the periods of the time, at least one processor is further to establish communications between at least one terminal and the satellites according to each of the routing graphs for each of the VRAs for the period of time.

In at least one embodiment, each of the routing graphs shows connectivity between at least one terrestrial cellular antenna/base station and at least some of the satellites, which are on the routing graph. In some embodiments, during each of the periods of the time, at least one processor is further to establish connectivity between at least one terrestrial cellular antenna/base station and the satellites according to each of the routing graphs for each of the VRAs for the period of time.

In one or more embodiments, the system is a transparent system where each of the gateways hosts virtual IP router instances for the satellites within the VRA associated with the gateway, and where the system operates to simulate that each payload of each of the satellites comprises IP routers. In at least one embodiment, each of the payloads of each of the satellites processes traffic transparently at a physical layer, and is able to establish network layer route peering relationships with the payloads of the satellites that are adjacent to one another. In some embodiments, the virtual IP router instances are used to establish link layer spanning tree peering relationships with the satellites that are adjacent to one another.

In at least one embodiment, the system is a regenerative system where each payload of each of the satellites comprises IP routers.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

DESCRIPTION

Figure 1:
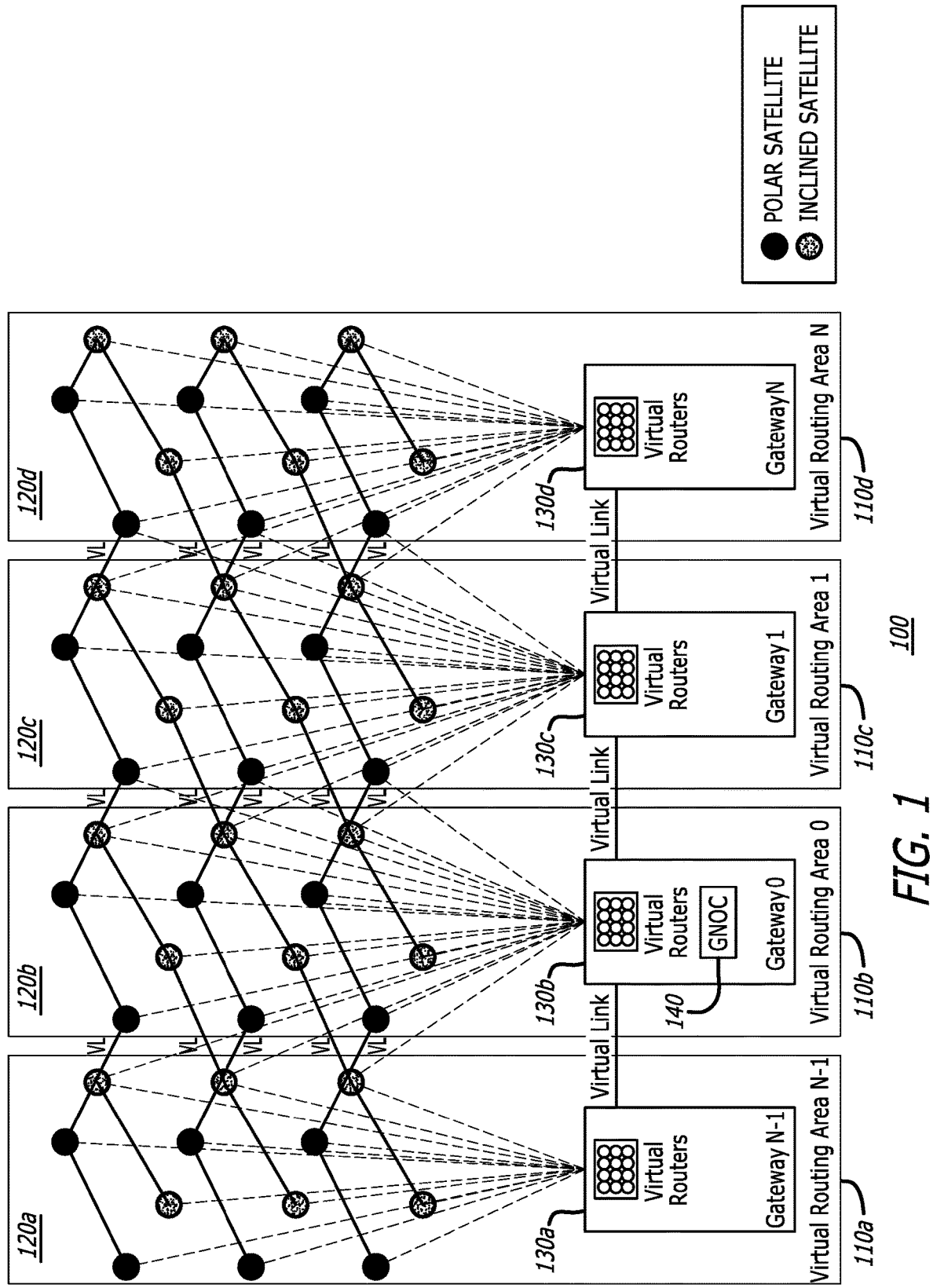
FIG. 1 is a diagram showing exemplary routing graphs that may be employed by the disclosed system for mobile routing for non-geostationary orbit (NGSO) systems using virtual routing areas (VRAs), in accordance with at least one embodiment of the present disclosure.

The methods and apparatus disclosed herein provide an operative system for mobile routing for non-geostationary orbit (NGSO) systems using virtual routing areas (VRAs).

As previously mentioned above, non-geostationary orbit (NGSO) systems employ constellations of satellites in low earth orbit (LEO) or medium earth orbit (MEO) that sweep across the earth at high rates of speed relative to geostationary earth orbit (GEO) satellites. As such, NGSO systems require a much larger number of terminal (e.g., a ground antenna or a satellite phone) handovers to be supported than GEO systems. In addition, unlike GEO systems, where terminal handovers are caused solely by terminal mobility (e.g., beam handover), NGSO systems necessarily must support multiple types of handovers including, but not limited to, inter-satellite handovers (due to satellite motion, rotation of the earth, and/or path optimization), inter-gateway handovers (due to rotation of the earth, user terminal mobility, and/or path optimization), link handovers (due to link outages, which may be due to node and/or link failures), and beam handovers (due to satellite motion, rotation of the earth, beam squint, and/or user terminal mobility).

Current solutions for routing NGSO systems employ link-state routing using on-board narrowband internet protocol (IP) routers (i.e. routers on-board the satellites). This approach implies that on-board routers establish and maintain links with their neighboring routers, establish and maintain synchronization of a link-state database at run time, and modulate/demodulate and inspect data packets at run-time in order to make real-time routing and forwarding decisions. As such, the routing for the entire satellite network needs to be updated in real-time each time there is a handover event. Because the entire network has to be updated for each handover event and because the NGSO system connectivity is constantly changing, the network management system must perform a large number of calculations for each update of the routing. Due to scalability issues with link-state routing, this approach does not scale beyond a few hundred satellites and associated links. Further, this approach does not provide a performant or scalable solution for addressing user terminal handover requirements.

In one or more embodiments, the system of the present disclosure reduces the complex problems of path management, dynamic routing and signaling, and user terminal handover of NGSO systems to a collection of simple link-state routing scenarios represented by a unique collection of static temporal-sliced graphs. This approach couples the concepts of virtual routing areas (VRAs) and temporally-sliced connected graphs with constraint-based routing and signaling in a software-defined network (SDN) operating environment. Further, this approach integrates connection management, location management, service requests, key performance indicator (KPI) monitoring, traffic engineering, admission control, and beam and carrier management into a comprehensive framework in order to enable a dynamic, scalable, and performant solution for systems (e.g., NGSO systems) that possess high user terminal handover requirements.

In particular, the system of the present disclosure provides a solution for reducing the number of calculations needed to determine handovers in a satellite constellation by creating a virtual routing area (VRA) by developing a graph of related/connected satellites at any given time interval. The graph represents the satellite-to-satellite and satellite-to-ground station connectivity. Because this graph is time based, the connectivity of the satellite network for a period of time (e.g., for the duration of a day) can be represented by a plurality of static graphs. This representation reduces the number of calculations needed to describe the network topology and enables the use of modern IP protocols to maintain communication in a satellite constellation.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to mobile satellite systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1 is a diagram 100 showing exemplary routing graphs 120a, 120b, 120c, 120d that may be employed by the disclosed system for mobile routing for non-geostationary orbit (NGSO) systems using virtual routing areas (VRAs) 110a, 110b, 110c, 110d in accordance with at least one embodiment of the present disclosure.

In this figure, the routing graphs 120a, 120b, 120c, 120d, for each of the VRAs 110a, 110b, 110c, 110d, are for a specific period of time. For example, the routing graphs 120a, 120b, 120c, 120d are all for a specific time on a specific day (e.g., all of the routing graphs 120a, 120b, 120c, 120d indicate specific routing (i.e. connectivity between specific nodes (e.g., satellites) to be used for a four minute interval from noon to 12:04 PM on a specific day of the year). It should be noted that in one or more embodiments, the specific period of time for the routing graphs 120a, 120b, 120c, 120d may be less than or more than four minutes, as is used in this example.

In addition, it should be noted that each of the VRAs 110a, 110b, 110c, 110d covers a specific geographical area on the Earth, such that the plurality of VRAs together 110a, 110b, 110c, 110d cover a specific geographic region on the Earth (e.g., a continent, an ocean, or a defined region). In one or more embodiments, the plurality of VRAs together 110a, 110b, 110c, 110d cover the entire surface of the Earth. In other embodiments, the plurality of VRAs together 110a, 110b, 110c, 110d only cover a portion of the surface of the Earth. It should be noted that, in one or more embodiments, more or less VRAs 110a, 110b, 110c, 110d than four VRAs as is shown in FIG. 1 may be employed for the disclosed system. In addition, it should be noted that the disclosed system may be scaled by using a border routing protocol (e.g., BGP) to interconnect the various global regions (or VRAs) of the system together (in the same way that it is used to interconnect different parts of the Internet).

Also in this figure, the routing graphs 120a, 120b, 120c, 120d, for each of the VRAs 110a, 110b, 110c, 110d, are each shown to include a gateway 130a, 130b, 130c, 130d. In one or more embodiments, a gateway 130a, 130b, 130c, 130d may comprise a stationary ground antenna that is associated with a satellite ground station. In some embodiments, a gateway 130a, 130b, 130c, 130d may be a mobile antenna associated with a vehicle. In at least one embodiment, a gateway 130a, 130b, 130c, 130d may be a terminal, such as a user terminal (e.g., mobile terminals, such as a cell phones, smart phones, connected car terminals; fixed terminals; and Internet of Things (IoT) terminals), aero terminals (e.g., terminals used for cockpit services, location tracking services, and inflight entertainment services), and maritime terminals (e.g., terminals used for ship-to-ship services, safety/emergency services, location tracking services, and entertainment services). In one or more embodiments, the terminal comprises a modem and at least one terrestrial antenna (e.g., a ground antenna, an antenna mounted on top of a building, or an antenna mounted on a terrestrial vehicle, such as a tank), an airborne antenna (e.g., an antenna mounted on an aircraft), or a marine antenna (e.g., an antenna mounted on a ship). The terminals may be stationary (e.g., a stationary ground antenna) or mobile (e.g., a satellite phone). In some embodiments, a gateway 130a, 130b, 130c, 130d may be a terrestrial cellular antenna/base station. It should be noted that, in one or more embodiments, each of the routing graphs 120a, 120b, 120c, 120d, for each of the VRAs 110a, 110b, 110c, 110d, may include more than one gateway 130a, 130b, 130c, 130d as is shown in FIG. 1.

In addition, the routing graphs 120a, 120b, 120c, 120d, are each shown to comprise a plurality of specific nodes (or vertices) (which are represented by the black and grey balls), which are within view of each other and of the gateway 130a, 130b, 130c, 130d during the specific period of time for the routing graphs 120a, 120b, 120c, 120d. For example, the nodes shown in routing graph 120a, which is for VRA 110a, are within view of each other and within view of gateway 130a during the specific period of time. In one or more embodiments, each of the routing graphs 120a, 120b, 120c, 120d, for each of the VRAs 110a, 110b, 110c, 110d, may include more or less nodes than are illustrated in FIG. 1.

The nodes in the routing graphs 120a, 120b, 120c, 120d are shown to be connected via lines (or edges), which are connectivity (or communication) links used to connect the nodes. In addition, VRAs 110a, 110b, 110c, 110d are shown to be connected together via virtual links (VLs) between the gateways 130a, 130b, 130c, 130d of the VRAs 110a, 110b, 110c, 110d and via virtual links (VLs) between neighboring nodes of the VRAs 110a, 110b, 110c, 110d.

In one or more embodiments, at least some of nodes in the routing graphs 120a, 120b, 120c, 120d may be satellites. Some of the nodes in the routing graphs 120a, 120b, 120c, 120d are satellites orbiting in a polar orbit (i.e. polar orbit satellites) (as denoted by the black balls), and other nodes in the routing graphs 120a, 120b, 120c, 120d are satellites orbiting in an inclined orbit (i.e. inclined orbit satellites) (as denoted by the grey balls). In one or more embodiments, the satellites may be low earth orbiting (LEO) satellites, medium earth orbiting (MEO) satellites, or geostationary earth orbit (GEO) satellites. It should be noted that the disclosed system may be employed for a LEO satellite constellation, a MEO satellite constellation, a hybrid LEO/MEO satellite constellation (which comprises both LEO and MEO satellites), a hybrid GEO/MEO satellite constellation (which comprises both GEO and MEO satellites), a hybrid GEO/LEO satellite constellation (which comprises both GEO and LEO satellites), or a hybrid GEO/MEO/LEO satellite constellation (which comprises GEO, MEO, and LEO satellites).

In one or more embodiments, at least some of the nodes in the routing graphs 120a, 120b, 120c, 120d may be a gateway, which may comprise a stationary ground antenna that is associated with a satellite ground station. In some embodiments, at least some of the nodes may be a mobile antenna associated with a vehicle. In at least one embodiment, at least some of the nodes may be a terminal, such as a user terminal (e.g., mobile terminals, such as a cell phones, smart phones, connected car terminals; fixed terminals; and Internet of Things (IoT) terminals), aero terminals (e.g., terminals used for cockpit services, location tracking services, and inflight entertainment services), and maritime terminals (e.g., terminals used for ship-to-ship services, safety/emergency services, location tracking services, and entertainment services). In one or more embodiments, the terminal comprises a modem and at least one terrestrial antenna (e.g., a ground antenna, an antenna mounted on top of a building, or an antenna mounted on a terrestrial vehicle, such as a tank), an airborne antenna (e.g., an antenna mounted on an aircraft), or a marine antenna (e.g., an antenna mounted on a ship). The terminals may be stationary (e.g., a stationary ground antenna) or mobile (e.g., a satellite phone). In some embodiments, at least some of the nodes may be a terrestrial cellular antenna/base station.

In at least one embodiment, at least some of the nodes may operate as access points in a terrestrial and/or cellular network. For these embodiments, the nodes can be used to attach to a satellite network and/or terrestrial cellular network and, as such, form a system referred to, in the United States, as an Ancillary Terrestrial Component (ATC), and, in Europe, as a Complementary Ground Component (CGC).

In this figure, any nodes connected to one another by solid lines may communicate (i.e. have connectivity) with one another. In addition, the routing graphs 120a, 120b, 120c, 120d show connectivity (e.g., communication) between the gateways 130a, 130b, 130c, 130d and the nodes within the VRAs 110a, 110b, 110c, 110d as shown by the dashed lines.

Also in this figure, gateway 130b, which is operating as a backbone area, is shown to include a global network operation center (GNOC) 140. The GNOC 140 may comprise at least one processor (not shown), which is located on at least one server (not shown) or computing device (not shown). In one or more embodiments, the GNOC 140 is in communication with the nodes as is shown and/or the gateways 130a, 130c. It should be noted that all of the virtual links (VLs) connect the VRAs 110a, 110b, 110c, 110d back to the backbone area (e.g., gateway 130b) as is shown in FIG. 1.

During operation of the disclosed system of FIG. 1 (e.g., for a transparent satellite system), at least one processor (e.g., which may be located at the global network operation center (GNOC) 140) (e.g., virtual routers) generates routing graphs 120a, 120b, 120c, 120d for each of the VRAs 110a, 110b, 110c, 110d for a specific period of time (e.g., a specific duration of time (e.g., four minutes) during a specific time (e.g., from noon to 12:04 PM) of a specific day of the year (e.g., Jan. 1, 2019)). The nodes (e.g., satellites) within the routing graphs 120a, 120b, 120c, 120d are within view of each other and of the gateway 130a, 130b, 130c, 130d of that particular routing graph 120a, 120b, 120c, 120d during the specific period of time for the routing graphs 120a, 120b, 120c, 120d. It should be noted that the processor(s) (e.g., virtual routers) will generate routing graphs for the VRAs 110a, 110b, 110c, 110d for other periods of time as well. For example, the processor(s) may generate routing graphs for the VRAs 110a, 110b, 110c, 110d for every four minute interval for an entire day for any number of days. As such, the processor(s) may generate routing graphs well in advance to the routing graphs being utilized for connectivity.

It should be noted that the system illustrated in FIG. 1 is a transparent satellite system, where each gateway 130a, 130b, 130c, 130d hosts virtual internet protocol (IP) router instances for the nodes (e.g., satellites) that are attached to that particular gateway 130a, 130b, 130c, 130d. As such, each gateway 130a, 130b, 130c, 130d is said to comprise virtual routers. For transparent satellite systems, the system operates to simulate that each payload of each of the satellites comprises IP routers. The payloads of each of the satellites process all traffic transparently at the physical layer, but by virtue of the association of the satellite payload and the gateway-hosted virtual router instances, are able to establish network layer route peering relationships with adjacent nodes (e.g., satellites) in the routing graph. This concept may also be applied at the link layer by using gateway-hosted virtual switch instances to establish link layer spanning tree peering relationships with adjacent switching nodes (e.g., satellites) in the routing graph 120a, 120b, 120c, 120d.

However, it should be noted that the disclosed system may alternatively be a regenerative system, where each satellite hosts virtual internet protocol (IP) router instances for itself and, as such, each satellite is said to comprise virtual routers. For regenerative systems, each payload of each of the satellites comprises IP routers.

Figure 2:
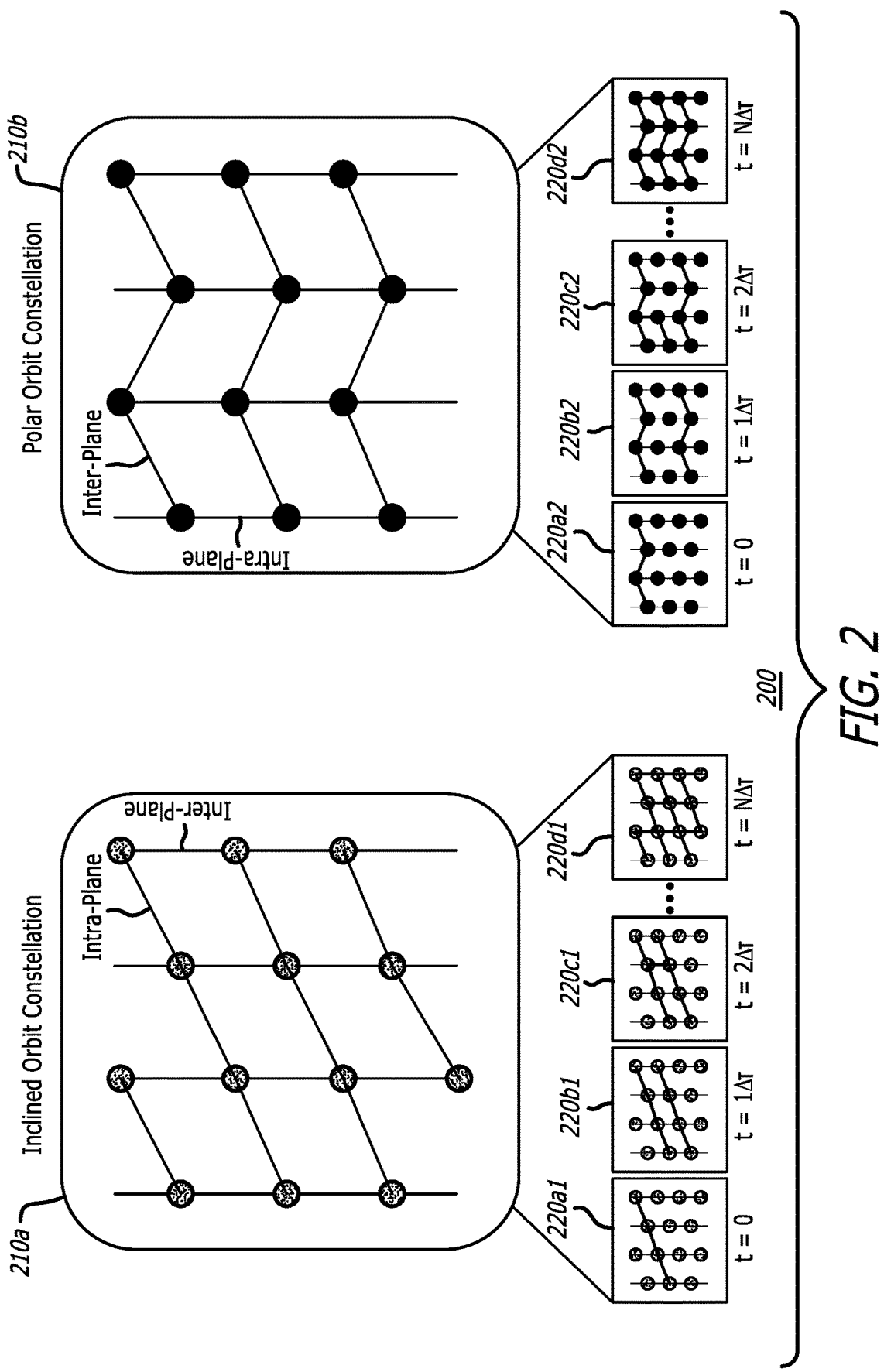
FIG. 2 is a diagram showing exemplary time-sliced graphs that may be employed by the disclosed system for mobile routing for NGSO systems using VRAs, in accordance with at least one embodiment of the present disclosure.

FIG. 2 is a diagram 200 showing exemplary time-sliced graphs 220a1, 220b1, 220c1, 220d1, 220a2, 220b2, 220c2, 220d2 that may be employed by the disclosed system for mobile routing for NGSO systems using VRAs, in accordance with at least one embodiment of the present disclosure. In this figure, a routing graph for a VRA (e.g., routing graph 120a of VRA 110a of FIG. 1) is represented by (i.e.

broken into) two separate routing graphs 210a, 210b, where one routing graph 210a represents the nodes denoted as inclined orbit satellites within the VRA 110a and the other routing graph 210b represents the nodes denoted as polar orbit satellites within the VRA 110a.

The solid vertical lines within the routing graph 210a each represent an inter-plane of the nodes (e.g., satellites), where any nodes (e.g., satellites) connected by solid vertical lines are within are within an adjacent orbital plane, and may communicate with one another. The solid diagonal lines within the routing graph 210a each represent an intra-plane of nodes (e.g., satellites), where any nodes (e.g., satellites) connected by solid diagonal lines are within the same orbital plane, and may communicate with each other.

The solid vertical lines within the routing graph 210b each represent an intra-plane of the nodes (e.g., satellites), where any nodes (e.g., satellites) connected by solid vertical lines are within are within the same orbital plane, and may communicate with one another. The solid diagonal lines within the routing graph 210b each represent an inter-plane of nodes (e.g., satellites), where any nodes (e.g., satellites) connected by solid diagonal lines are within an adjacent orbital plane, and may communicate with each other.

During operation of the disclosed system, at least one processor (e.g., which may be located at the global network operation center (GNOC) 140) (e.g., virtual routers), by utilizing constraint-based optimization algorithms, generates at least one time-sliced graph 220a1, 220b1, 220c1, 220d1, 220a2, 220b2, 220c2, 220d2 for each routing graph for each to establish routing for the nodes (e.g., satellites) for the specific period of time. For example, the processor(s) generates time-sliced graphs 220a1, 220b1, 220c1, 220d1 for four time increments (t=0, t=1$\Delta$T, t=2$\Delta$T, and t=3$\Delta$T) (i.e. for four epochs) for routing graph 210a for the VRA 110a. As another example, the processor(s) generates time-sliced graphs 220a2, 220b2, 220c2, 220d2 for four time increments (t=0, t=1$\Delta$T, t=2$\Delta$T, and t=3$\Delta$T) for routing graph 210b for the VRA 110a. The time increments, for example, may be one minutes each (e.g., $\Delta$T=1 minute). Also, for example, time-sliced graphs 220a1, 220a2 are for the time period of noon to 12:01 PM on Jan. 1, 2019; time-sliced graphs 220b1, 220b2 are for the time period of 12:01 to 12:02 PM on Jan. 1, 2019; time-sliced graphs 220c1, 220c2 are for the time period of 12:02 to 12:03 PM on Jan. 1, 2019; and time-sliced graphs 220d1, 220d2 are for the time period of 12:03 to 12:04 PM on Jan. 1, 2019, when N is equal to 3. In one or more embodiments, the time increments may be a longer or shorter duration than one minute, as is used in the example. In some embodiments, the time increments may be of various different lengths of time for at least some of the time-sliced graphs. In addition, in one or more embodiments, the processor(s) may generate more or less than four time-sliced graphs for each routing graph, as is used in this example.

The bold lines connecting the nodes (e.g., satellites) on each of the time-sliced graphs 220a1, 220b1, 220c1, 220d1, 220a2, 220b2, 220c2, 220d2 show the connectivity (i.e. communication) between the specific nodes (e.g., satellites) during the specific period of time for that particular time-sliced graph. For example, for the time period of t=0 (e.g., the time period of noon to 12:01 PM on Jan. 1, 2019), time-sliced graph 220a1 shows that a set of four nodes (e.g., inclined orbit satellites) have connectivity (i.e. are in communication) with one another during this period of time. As another example, for the time period of t=1$\Delta$T (e.g., the time period of 12:01 to 12:02 PM on Jan. 1, 2019), time-sliced graph 220b1 shows that one set of four nodes (e.g., inclined orbit satellites) have connectivity (i.e. are in communication) with one another during this period of time, and that another set of four nodes (e.g., inclined orbit satellites) have connectivity (i.e. are in communication) with one another during this period of time. As yet another example, for the time period of t=2$\Delta$T (e.g., the time period of 12:02 to 12:03 PM on Jan. 1, 2019), time-sliced graph 220c1 shows that one set of four nodes (e.g., inclined orbit satellites) (which have connectivity (i.e. are in communication) with one another) and the other set of four nodes (e.g., inclined orbit satellites) (which have connectivity (i.e. are in communication) with one another) have connectivity (i.e. are in communication) with each other during this period of time (i.e. all eight of the nodes (e.g., inclined orbit satellites) have connectivity (i.e. are in communication) with each other during this period of time).

Also during operation, during the period of time (e.g., for time period t=0), the processor(s) (e.g., virtual routers) allocates specific virtual internet protocol (IP) and media access control (MAC) layer addresses (e.g., internet protocol (IP) addresses), which are associated with the gateway (e.g., gateway 130a) of the routing graph (e.g., routing graph 120a) associated with that period of time to the nodes (e.g., satellites) that are shown in the routing graph (e.g., routing graph 120a) for that period of time. For example, each of the nodes (e.g., satellites) within the routing graph (e.g., routing graph 120a) will be assigned a unique IP address that is associated with the gateway (e.g., gateway 130a) shown within the routing graph (e.g., routing graph 120a). In one or more embodiments, an internet protocol (IP) is utilized for all communications within the disclosed system.

Also during the period of time (e.g., for time period t=0), the processor(s) establishes connectivity (e.g., communication) between the nodes (e.g., satellites) with each other as shown in the time-sliced graphs (e.g., time-sliced graphs 220a1, 220a2) for that period of time. As such, during the period of time, the nodes (e.g., satellites) have connectivity (i.e. are in communication) with one other as shown in the time-sliced graphs (e.g., time-sliced graphs 220a1, 220a2) for that period of time.

Figure 3:
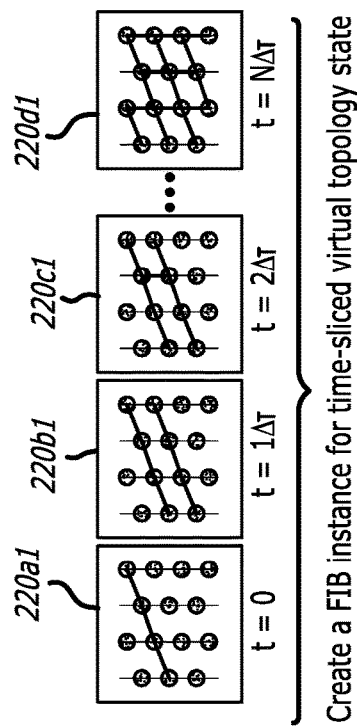
FIG. 3 is an exemplary functional block diagram for the disclosed system for mobile routing for NGSO systems using VRAs, in accordance with at least one embodiment of the present disclosure.
Figure 3:
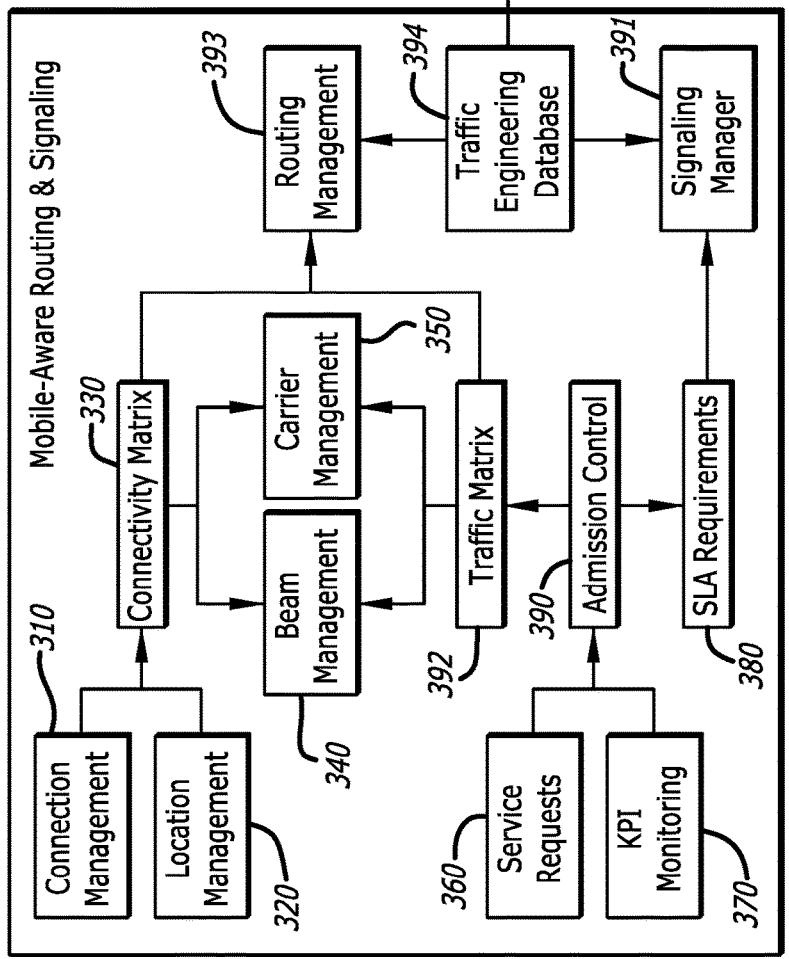

FIG. 3 is an exemplary functional block diagram 300 for the disclosed system for mobile routing for NGSO systems using VRAs, in accordance with at least one embodiment of the present disclosure. In this figure, a forward information database (FIB) instance is created for each topology state (e.g., for each epoch) for each node (e.g., satellite) in the system.

During operation to create an FIB instance, connection management (which analyzes all of the different connections between the different planes of the network) 310 and location management (which analyzes all of the locations of the nodes (e.g., satellites and/or terminals) in the system) 320 together determine a connectivity matrix (e.g., generate time-sliced graphs for each VRA) 330. According to the connectivity matrix 330, the satellite beams for the satellites are configured and the carrier frequencies of the satellite signals are configured. Data including, but not limited to, service requests (e.g., related to user requests for service) 360, key performance parameters (KPI) 370, and service level agreement (SLA) requirements (e.g., gold level, silver level, and bronze level of service) 380 along with admission control 390 and a traffic matrix 392 are utilized by the connection management 310 and the location management 320 to continually and dynamically update the connectivity matrix 330 as appropriate.

A routing manager 393 utilizes the connectivity matrix 330 and the traffic matrix 392 as well as a traffic engineering database 394 to manage the connectivity paths between the nodes (e.g., satellites and terminals). The traffic engineering database 394 comprises traffic engineering databases (TED) 395 for each period of time (e.g., epoch) and routing information databases (RIB) 396 for each period of time (e.g., epoch). Also, a signaling manager 391 utilizes the SLA requirements 380 and the traffic engineering database 394 to manage sessions that use the paths as transport.

Figure 4:
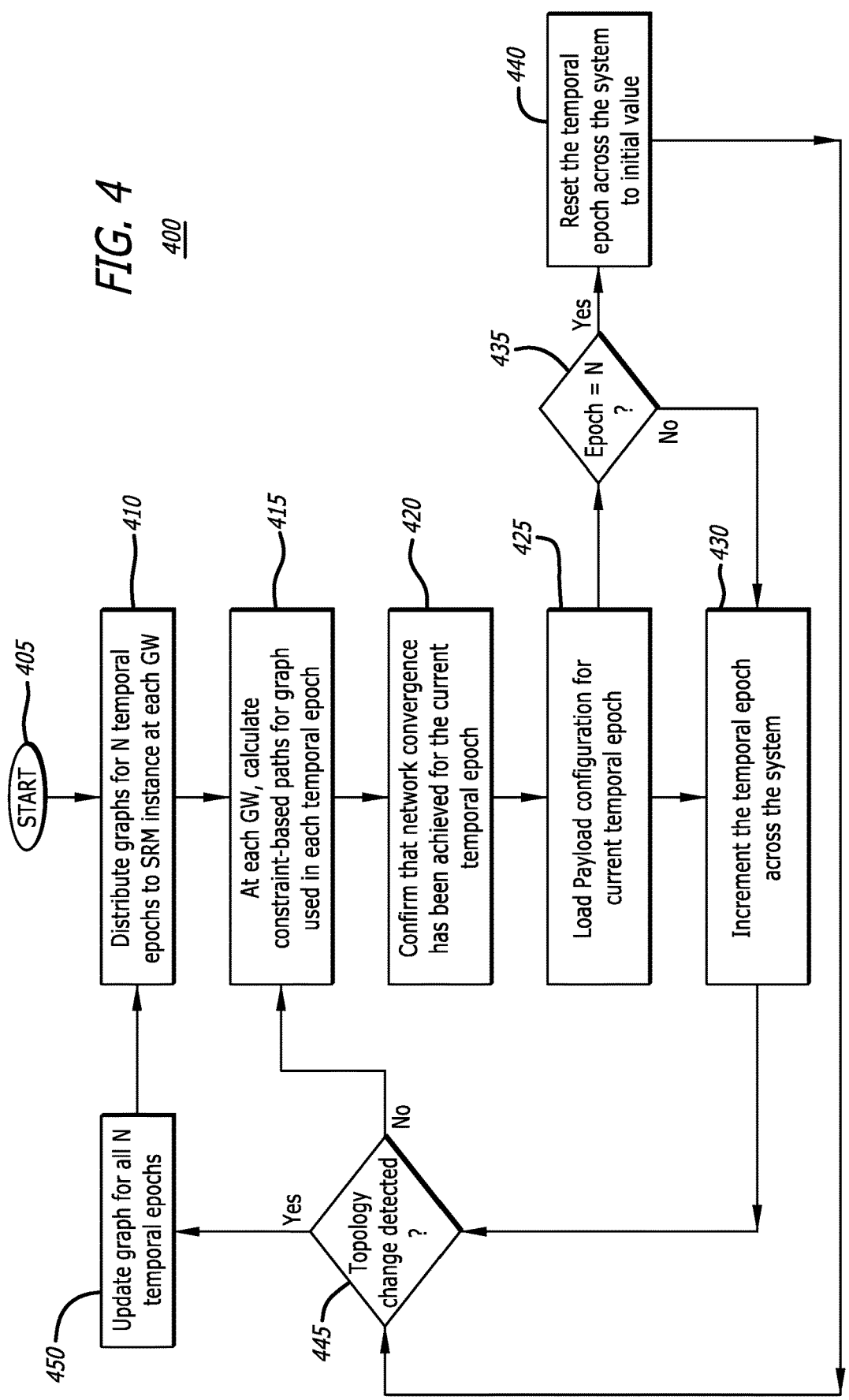
FIG. 4 is a flow chart for a disclosed method for mobile routing for NGSO systems using VRAs, in accordance with at least one embodiment of the present disclosure.

FIG. 4 is a flow chart for a disclosed method 400 for mobile routing for NGSO systems using VRAs, in accordance with at least one embodiment of the present disclosure. At the start 405 of the method 400, at least one processor (e.g., which may be located at the global network operation center (GNOC) 140) distributes graphs (e.g., time-sliced graphs 220a1, 220b1, 220c1, 220d1) for N number of temporal epochs (i.e. for N number of periods of time, such as t=0, t=1ΔT, t=2ΔT, . . . t=NΔT) to a system resource manager (SRM) (e.g., virtual routers) at each gateway (e.g., gateway 130a) 410. Then, each gateway SRM (e.g., virtual routers) calculates (i.e. determines) constraint-based paths for the time-sliced graph used for each epoch for each of the VRAs (i.e. each gateway SRM determines the shortest communication paths between the nodes (e.g., satellites) with each other to be utilized based on time-sliced graphs and the constraints (e.g., a weighted combination of bandwidth capacity, time delay, and/or signal strength loss)) 415.

Then, each gateway SRM (e.g., virtual routers) determines that network convergence has been achieved for the current temporal epoch (e.g., that every node (e.g., satellites and/or user terminals) in the satellite network of the time-sliced graph has their database fully synchronized in the network) 420. Each gateway SRM (e.g., virtual routers) then loads the payload configuration for the nodes (e.g., satellites) for the current temporal epoch according to the time-sliced graph (e.g., each gateway SRM dynamically switches antenna beams on the satellites for newly added satellites and for deleted satellites based on the change from the previous time-sliced graph to the current time-sliced graph) 425.

Then, at least one processor (e.g., which may be located at the global network operation center (GNOC) 140) determines whether the temporal epoch is the last temporal epoch (i.e. whether the temporal epoch number is equal to N) for the time-sliced graphs 435. If the processor(s) determines that the temporal epoch is the last temporal epoch, then the processor(s) will reset the temporal epoch number across the system for all of the VRAs back to the initial value (e.g., reset N equal to zero (0)) 440. Then, the processor(s) will determine whether the topology has changed for each VRA in the system (e.g., whether there is a change in the nodes (e.g., satellites) that each gateway views, whether any of the nodes (e.g., satellites) in the system are not in service, and/or whether there are any communications link failures in the system) 445. If the processor(s) determines that there is no change in any of the satellite topologies, then the method 400 will proceed back to step 415 shown.

However, if the processor(s) determines that there is a change in the topology for any of the VRAs, the processor(s) will update the time-sliced graphs for all of the remaining temporal epochs based on the change in topology for those VRAs 450. Then, the method 400 will proceed back to step 410 as shown.

If the processor(s) determines that the temporal epoch is not the last temporal epoch, then the processor(s) will increment the temporal epoch number across the system for all of the VRAs to the next value (e.g., if N is equal to one (1), then the processor(s) will increment N to equal two (2)) 430. Then, the method 400 will proceed to step 445 as shown.

Figure 5:
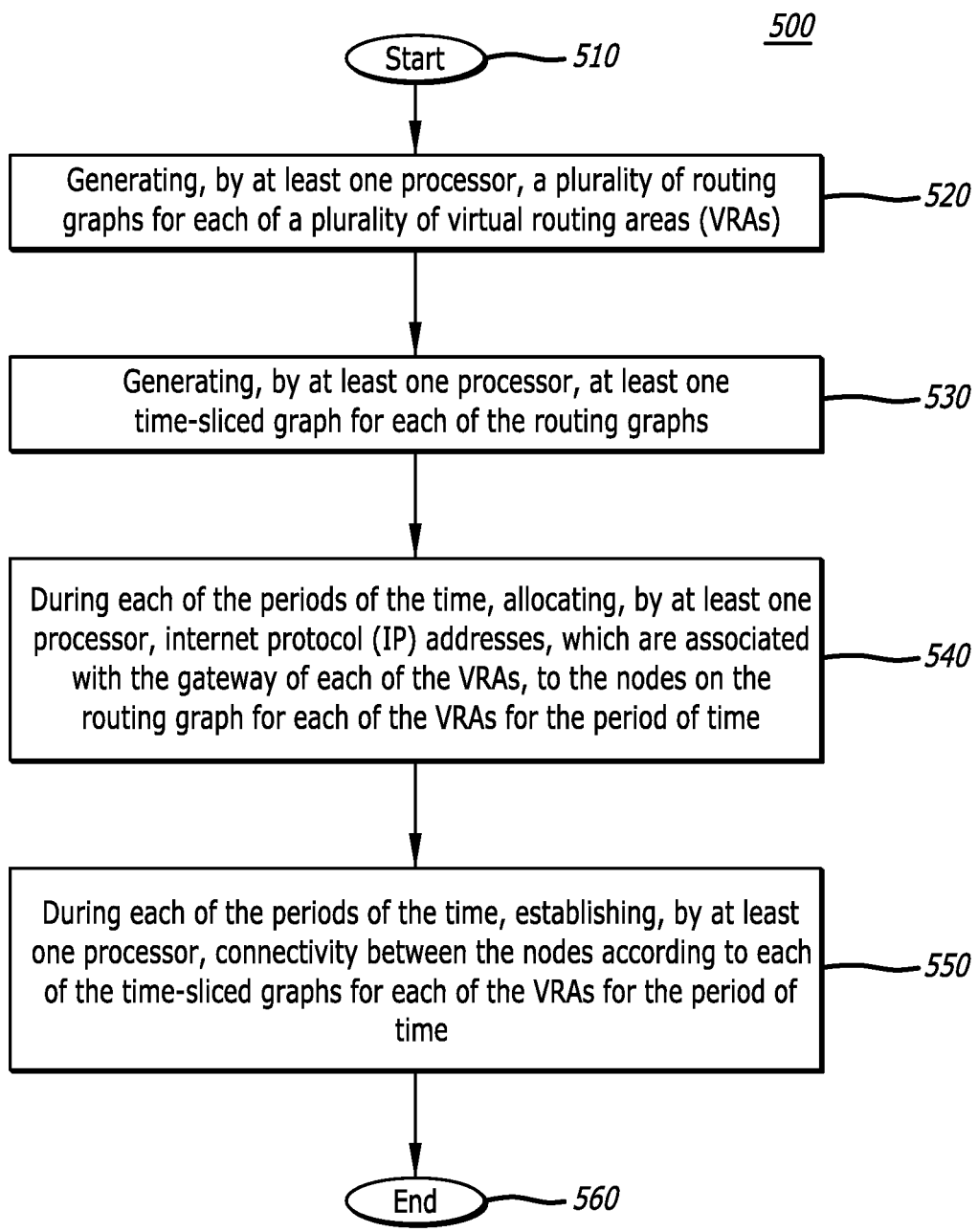
FIG. 5 is a flow chart for a simplified disclosed method for mobile routing for NGSO systems using VRAs, in accordance with at least one embodiment of the present disclosure.

FIG. 5 is a flow chart for a simplified disclosed method 500 for mobile routing for NGSO systems using VRAs, in accordance with at least one embodiment of the present disclosure. At the start 510 of the method 500, at least one processor (e.g., which may be located at the global network operation center (GNOC) 140) generates a plurality of routing graphs for each of a plurality of virtual routing areas (VRAs) 520. In one or more embodiments, each of the routing graphs, for each of the VRAs, is for a different period of time. In some embodiments, each of the routing graphs, for each of the VRAs, comprises a gateway, which is associated with the VRA associated with the routing graph, and nodes (e.g., satellites, terminals, gateways, and/or terrestrial cellular antenna/base stations) that are within view or each other and of the gateway during the period of time associated with the routing graph. Then, at least one processor generates at least one time-sliced graph for each of the routing graphs 530. In one or more embodiments, each of the time-sliced graphs shows connectivity between at least some of the nodes, which are on the routing graph associated with the time-sliced graph.

During each of the periods of time, at least one processor allocates internet protocol (IP) addresses, which are associated with the gateway of each of the VRAs, to the nodes on the routing graph for each of the VRAs for the period of time 540. Also, during each of the periods of time, at least one processor establishes connectivity between the nodes according to each of the time-sliced graphs for each of the VRAs for the period of time 550. Then, the method 500 ends 560.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method for routing a satellite system, the method comprising:

generating, by at least one processor, a plurality of routing graphs for each of a plurality of virtual routing areas (VRAs), wherein each of the VRAs covers a different specific geographical area on Earth from one another,
wherein each of the routing graphs, for each of the VRAs, is for a different period of time, and
wherein each of the routing graphs, for each of the VRAs, comprises a gateway, which is associated with the VRA associated with the routing graph, and satellites that are within view of each other and of the gateway during the period of time associated with the routing graph;
generating, by the at least one processor, at least one time-sliced graph for each of the routing graphs, wherein each of the time-sliced graphs shows connectivity between at least some of the satellites, which are on the routing graph associated with the time-sliced graph, with each other and denotes the satellites in at least one of an inclined orbit or a polar orbit; and
during each of the periods of the time, establishing, by the at least one processor, connectivity between the satellites according to each of the time-sliced graphs for each of the VRAs for the period of time.

2. The method of claim 1, wherein the method further comprises, during each of the periods of the time, allocating, by the at least one processor, internet protocol (IP) addresses, which are associated with the gateway of each of the VRAs, to the satellites on the routing graph for each of the VRAs for the period of time.

3. The method of claim 1, wherein an internet protocol (IP) is utilized for all communications within the satellite system.

4. The method of claim 1, wherein each of the routing graphs shows connectivity between at least one terminal and at least some of the satellites, which are on the routing graph; and
wherein the method further comprises, during each of the periods of the time, establishing, by the at least one processor, connectivity between the at least one terminal and the satellites according to each of the routing graphs for each of the VRAs for the period of time.

5. The method of claim 4, wherein the at least one terminal is one of stationary or mobile.

6. The method of claim 4, wherein the at least one terminal comprises a baseband modem and at least one of a terrestrial antenna, an airborne antenna, or a marine antenna.

7. The method of claim 1, wherein each of the routing graphs shows connectivity between at least one terrestrial cellular antenna/base station and at least some of the satellites, which are on the routing graph; and
wherein the method further comprises, during each of the periods of the time, establishing, by the at least one processor, connectivity between the at least one terrestrial cellular antenna/base station and the satellites according to each of the routing graphs for each of the VRAs for the period of time.

8. The method of claim 1, wherein the at least one processor is located at a global network operation center (GNOC).

9. The method of claim 1, wherein each of the gateways comprises a ground antenna associated with a satellite ground station.

10. The method of claim 1, wherein each of the satellites is one of a low earth orbiting (LEO) satellite, a medium earth orbiting (MEO) satellite, or a geostationary earth orbit (GEO) satellite.

11. The method of claim 1, wherein each of the satellites is in one of a polar orbit or an inclined orbit.

12. A satellite system, the system comprising:
at least one processor to generate a plurality of routing graphs for each of a plurality of virtual routing areas (VRAs), wherein each of the VRAs covers a different specific geographical area on Earth from one another,
wherein each of the routing graphs, for each of the VRAs, is for a different period of time,
wherein each of the routing graphs, for each of the VRAs, comprises a respective gateway, which is associated with the VRA associated with the routing graph, and satellites that are within view of each other and of the gateway during the period of time associated with the routing graph,
the at least one processor is further to generate at least one time-sliced graph for each of the routing graphs, wherein each of the time-sliced graphs shows connectivity between at least some of the satellites, which are on the routing graph associated with the time-sliced graph, with each other and denotes the satellites in at least one of an inclined orbit or a polar orbit, and
the at least one processor is further to establish, during each of the periods of the time, connectivity between the satellites according to each of the time-sliced graphs for each of the VRAs for the period of time.

13. The system of claim 12, wherein during each of the periods of the time, the at least one processor is further to allocate internet protocol (IP) addresses, which are associated with the gateway of each of the VRAs, to the satellites on the routing graph for each of the VRAs for the period of time.

14. The system of claim 12, wherein an internet protocol (IP) is utilized for all communications within the satellite system.

15. The system of claim 12, wherein each of the routing graphs shows connectivity between at least one terminal and at least some of the satellites, which are on the routing graph; and
during each of the periods of the time, the at least one processor is further to establish communications between the at least one terminal and the satellites according to each of the routing graphs for each of the VRAs for the period of time.

16. The system of claim 12, wherein each of the routing graphs shows connectivity between at least one terrestrial cellular antenna/base station and at least some of the satellites, which are on the routing graph; and
during each of the periods of the time, the at least one processor is further to establish connectivity between the at least one terrestrial cellular antenna/base station and the satellites according to each of the routing graphs for each of the VRAs for the period of time.

17. The system of claim 12, wherein the system is a transparent system where each of the gateways hosts virtual IP router instances for the satellites within the VRA associated with the gateway, and
wherein the system operates to simulate that each payload of each of the satellites comprises IP routers.

18. The system of claim 17, wherein each of the payloads of each of the satellites processes traffic transparently at a physical layer, and is able to establish network layer route peering relationships with the payloads of the satellites that are adjacent to one another.

19. The system of claim 17, wherein the virtual IP router instances are used to establish link layer spanning tree peering relationships with the satellites that are adjacent to one another.

20. The system of claim 12, wherein the system is a regenerative system where each payload of each of the satellites comprises IP routers.

* * * * *